US012783687B2

(12) United States Patent
Saroj et al.

(10) Patent No.: US 12,783,687 B2
(45) Date of Patent: Nov. 3, 2026

(54) GRAPH-BASED ARTIFICIAL INTELLIGENCE AGENT

(71) Applicant: Simbian, Inc., Mountain View, CA (US)

(72) Inventors: Prince Saroj, Bengaluru (IN); Alankrit Chona, Redwood City, CA (US); Jonathan Todd, Hephzibah, GA (US); Ambuj Kumar, Sunnyvale, CA (US)

(73) Assignee: Simbian, Inc, Mountain View, CA (US)

(*) Notice: Subject to any disclaimer, the term of this patent is extended or adjusted under 35 U.S.C. 154(b) by 42 days.

(21) Appl. No.: 18/977,089

(22) Filed: Dec. 11, 2024

(65) Prior Publication Data

US 2026/0161796 A1 Jun. 11, 2026

(51) Int. Cl.

| | |
|---|---|
| ***G06F 21/57*** | (2013.01) |
| ***G06F 3/04842*** | (2022.01) |
| ***G06F 9/451*** | (2018.01) |

(52) U.S. Cl.

CPC ........ *G06F 21/577* (2013.01); *G06F 3/04842* (2013.01); *G06F 9/451* (2018.02)

(58) Field of Classification Search

CPC ..... G06F 21/577; G06F 3/04842; G06F 9/451
See application file for complete search history.

(56) References Cited

U.S. PATENT DOCUMENTS

| | | | | |
|---|---|---|---|---|
| 5,630,184 | A * | 5/1997 | Roper | H04L 12/1886 709/221 |
| 7,162,649 | B1 * | 1/2007 | Ide | H04L 63/102 709/227 |
| 8,418,249 | B1 * | 4/2013 | Nucci | G06F 21/552 709/225 |
| 8,881,288 | B1 * | 11/2014 | Levy | G06F 21/577 709/225 |
| 9,210,185 | B1 * | 12/2015 | Pinney Wood | G06F 16/9024 |
| 9,419,854 | B1 * | 8/2016 | Wang | H04L 41/0654 |
| 10,021,124 | B2 * | 7/2018 | Oliphant | H04L 63/0227 |
| 10,075,466 | B1 * | 9/2018 | Oliphant | H04L 63/1416 |
| 10,379,995 | B1 * | 8/2019 | Walters | G06F 9/541 |
| 10,402,452 | B1 * | 9/2019 | Evenson | G06F 16/137 |
| 10,509,844 | B1 * | 12/2019 | Mcintyre | G06F 16/9577 |
| 10,536,472 | B2 | 1/2020 | Jang et al. | |
| 10,613,722 | B1 * | 4/2020 | Philipson | G06F 3/04845 |
| 10,735,442 | B1 * | 8/2020 | Swackhamer | G06F 21/56 |

(Continued)

*Primary Examiner* — Aravind K Moorthy

(74) *Attorney, Agent, or Firm* — Jeremy A. Briggs

(57) ABSTRACT

A system having transceiver and processor is disclosed. The transceiver may receive an alert from a security tool associated with an organization. The processor may obtain the alert from the transceiver, and generate an interactive graph interface. The interactive graph interface includes a primary node corresponding to the alert, and a set of secondary nodes connected to the primary node. The set of secondary nodes may include a set of hypotheses node chains. Each hypotheses node chain includes a first level hypothesis node and a second level hypothesis node. Each hypothesis node represents a hypothesis, to be further investigated by a user, associated with the alert. The processor may render the interactive graph interface on a user interface, obtain a user input indicative of a selection of a first secondary node from the set of secondary nodes via the user interface, and perform an action based on the user input.

19 Claims, 6 Drawing Sheets

(56) References Cited

U.S. PATENT DOCUMENTS

| | | | | |
|---|---|---|---|---|
| 10,817,604 | B1 * | 10/2020 | Kimball | G06F 21/563 |
| 11,070,579 | B1 * | 7/2021 | Kiernan | G06F 21/552 |
| 11,201,890 | B1 * | 12/2021 | Coull | G06F 16/9024 |
| 11,232,235 | B2 * | 1/2022 | Hadar | G06F 16/9024 |
| 11,281,460 | B1 * | 3/2022 | Reddy | G06F 8/75 |
| 11,290,494 | B2 * | 3/2022 | Li | G06F 21/552 |
| 11,305,796 | B1 * | 4/2022 | Shue | B61K 9/08 |
| 11,411,976 | B2 * | 8/2022 | Basovskiy | H04L 63/1425 |
| 11,444,974 | B1 * | 9/2022 | Shakhzadyan | H04L 63/1466 |
| 11,457,030 | B2 | 9/2022 | Humphrey et al. | |
| 11,563,755 | B2 | 1/2023 | Narula et al. | |
| 11,620,338 | B1 * | 4/2023 | Bullard | G06F 16/287 707/798 |
| 11,689,555 | B2 * | 6/2023 | Cai | G06F 21/577 726/25 |
| 11,720,686 | B1 * | 8/2023 | Cross | G06F 9/455 726/25 |
| 11,734,419 | B1 * | 8/2023 | Mackle | G06F 21/552 726/22 |
| 11,734,423 | B1 * | 8/2023 | Soliman | G06F 21/554 726/23 |
| 11,770,401 | B2 * | 9/2023 | Geil | G06F 16/24578 726/25 |
| 11,895,150 | B2 * | 2/2024 | Engelberg | H04L 63/1433 |
| 11,973,788 | B2 * | 4/2024 | Kuppa | H04L 63/145 |
| 11,995,419 | B1 * | 5/2024 | Kdoshim | G06F 8/33 |
| 12,079,347 | B2 * | 9/2024 | Dahlberg | G06F 21/577 |
| 12,118,021 | B1 * | 10/2024 | Schmidt | G06F 16/248 |
| 12,282,549 | B2 * | 4/2025 | Morris | G06F 21/577 |
| 12,282,564 | B2 * | 4/2025 | Vadala | G06F 21/577 |
| 12,314,385 | B1 * | 5/2025 | Beauchesne | G06F 11/3051 |
| 12,353,563 | B2 * | 7/2025 | Poulin | G06F 21/577 |
| 12,355,798 | B2 * | 7/2025 | Engelberg | G06F 21/577 |
| 12,373,497 | B1 * | 7/2025 | Fletcher | G06F 9/45533 |
| 12,489,771 | B1 * | 12/2025 | Erlingsson | G06F 9/5072 |
| 12,495,052 | B1 * | 12/2025 | Godefroid | G06F 16/9024 |
| 12,518,021 | B1 * | 1/2026 | Berkovitz | G06F 21/577 |
| 12,561,615 | B2 * | 2/2026 | Shaver | G06N 5/022 |
| 12,563,065 | B2 * | 2/2026 | Sundaravel | H04L 63/1425 |
| 12,619,740 | B2 * | 5/2026 | Beard | G06F 21/566 |
| 2002/0107892 | A1 * | 8/2002 | Chittu | G06F 3/0482 715/255 |
| 2010/0186088 | A1 * | 7/2010 | Banerjee | H04L 63/1433 709/224 |
| 2011/0167088 | A1 * | 7/2011 | Warren | G06F 8/427 707/E17.012 |
| 2011/0234595 | A1 * | 9/2011 | Poston | G06T 11/20 345/440 |
| 2013/0091539 | A1 * | 4/2013 | Khurana | G06F 21/577 726/1 |
| 2013/0179937 | A1 * | 7/2013 | Mont | G06F 21/105 726/1 |
| 2014/0013309 | A1 * | 1/2014 | Gounares | G06F 11/3698 717/125 |
| 2014/0351717 | A1 * | 11/2014 | Pryor | G06F 3/0482 715/753 |
| 2015/0020199 | A1 * | 1/2015 | Neil | H04L 63/1408 726/23 |
| 2015/0096036 | A1 * | 4/2015 | Beskrovny | G06F 21/577 726/25 |
| 2015/0332054 | A1 * | 11/2015 | Eck | H04L 63/1416 726/25 |
| 2015/0363702 | A1 * | 12/2015 | Baum | G06N 7/01 706/52 |
| 2016/0028753 | A1 * | 1/2016 | Di Pietro | G06F 21/577 726/23 |
| 2016/0056996 | A1 * | 2/2016 | Anand | G06F 9/5061 370/221 |
| 2016/0110551 | A1 * | 4/2016 | Fugate | G06F 21/552 726/25 |
| 2016/0205122 | A1 * | 7/2016 | Bassett | H04L 63/1441 726/23 |
| 2017/0010787 | A1 * | 1/2017 | Ranganathan | G06F 3/04842 |
| 2017/0078322 | A1 * | 3/2017 | Seiver | H04L 63/101 |
| 2017/0277769 | A1 * | 9/2017 | Pasupathy | H04L 41/22 |
| 2017/0289187 | A1 * | 10/2017 | Noel | G06F 16/28 |
| 2017/0329972 | A1 * | 11/2017 | Brisebois | G06F 21/577 |
| 2018/0032724 | A1 * | 2/2018 | Tang | G06F 21/552 |
| 2018/0084001 | A1 * | 3/2018 | Hudis | H04L 63/1408 |
| 2018/0103121 | A1 * | 4/2018 | Yun | H04L 67/34 |
| 2018/0123942 | A1 * | 5/2018 | Amemiya | H04L 45/38 |
| 2018/0137001 | A1 * | 5/2018 | Zong | G06N 5/022 |
| 2018/0199242 | A1 * | 7/2018 | Deng | H04W 36/0038 |
| 2018/0322292 | A1 * | 11/2018 | Tedeschi | H04L 63/1433 |
| 2019/0081967 | A1 * | 3/2019 | Balabine | H04L 63/1425 |
| 2019/0228353 | A1 * | 7/2019 | Gefen | G06Q 10/067 |
| 2019/0260804 | A1 * | 8/2019 | Beck | G06F 16/2455 |
| 2019/0354906 | A1 * | 11/2019 | Stanciu | G06Q 10/0631 |
| 2019/0372940 | A1 * | 12/2019 | Mcdougall | G06F 21/10 |
| 2020/0053025 | A1 * | 2/2020 | Evans | H04L 69/22 |
| 2020/0067985 | A1 | 2/2020 | Bhargava et al. | |
| 2020/0099570 | A1 * | 3/2020 | Chatterjee | H04L 41/06 |
| 2020/0117657 | A1 * | 4/2020 | Xie | G06Q 20/02 |
| 2020/0127833 | A1 * | 4/2020 | Konda | H04L 63/00 |
| 2020/0162500 | A1 * | 5/2020 | Ciocarlie | G06F 21/577 |
| 2020/0169565 | A1 * | 5/2020 | Badawy | G06F 16/9024 |
| 2020/0175174 | A1 * | 6/2020 | Bakalli | G06F 8/71 |
| 2020/0177615 | A1 * | 6/2020 | Grabois | H04L 63/20 |
| 2020/0201989 | A1 * | 6/2020 | Shu | G06F 21/577 |
| 2020/0218801 | A1 * | 7/2020 | Gross | G06F 21/566 |
| 2020/0296117 | A1 * | 9/2020 | Karpovsky | G06F 21/552 |
| 2020/0366671 | A1 * | 11/2020 | Larson | H04L 9/3231 |
| 2020/0389823 | A1 * | 12/2020 | Xu | H04W 76/15 |
| 2021/0056215 | A1 * | 2/2021 | Guha | G06F 16/21 |
| 2021/0081539 | A1 * | 3/2021 | Karin | G06F 21/552 |
| 2021/0082167 | A1 * | 3/2021 | Jewett | G06T 11/26 |
| 2021/0082309 | A1 * | 3/2021 | Rosenberg | G09B 5/02 |
| 2021/0133331 | A1 * | 5/2021 | Lipkis | H04L 63/1483 |
| 2021/0174148 | A1 * | 6/2021 | Raveh | G06V 10/774 |
| 2021/0248443 | A1 * | 8/2021 | Shu | H04L 63/1416 |
| 2021/0297427 | A1 | 9/2021 | Narula et al. | |
| 2022/0012069 | A1 * | 1/2022 | Verma | G06F 3/04817 |
| 2022/0053011 | A1 * | 2/2022 | Rao | H04L 63/1433 |
| 2022/0078198 | A1 * | 3/2022 | Gingras | G06F 18/232 |
| 2022/0121965 | A1 * | 4/2022 | Chatterji | G06F 16/9024 |
| 2022/0156599 | A1 * | 5/2022 | Pai | G06F 18/22 |
| 2022/0179893 | A1 * | 6/2022 | Kim | G06F 16/345 |
| 2022/0224724 | A1 | 7/2022 | Bazalgette et al. | |
| 2022/0263860 | A1 | 8/2022 | Crabtree et al. | |
| 2022/0335448 | A1 * | 10/2022 | Garg | H04L 67/535 |
| 2022/0360597 | A1 * | 11/2022 | Fellows | G06F 21/577 |
| 2023/0012220 | A1 * | 1/2023 | Humphrey | H04L 41/16 |
| 2023/0097979 | A1 * | 3/2023 | Tyler | H04L 43/022 |
| 2023/0118230 | A1 * | 4/2023 | Tschetter | G06F 16/2471 707/770 |
| 2023/0121966 | A1 * | 4/2023 | Coutinho | G06F 16/288 705/30 |
| 2023/0139000 | A1 * | 5/2023 | Apger | G06F 3/0482 726/1 |
| 2023/0222150 | A1 * | 7/2023 | Sun | G06F 16/9024 707/740 |
| 2023/0237377 | A1 * | 7/2023 | Shaver | G06N 5/022 706/12 |
| 2023/0283521 | A1 * | 9/2023 | Berger | H04L 63/20 709/223 |
| 2023/0305870 | A1 * | 9/2023 | Carey | H04L 9/50 |
| 2023/0342185 | A1 * | 10/2023 | Besson | G06N 5/01 |
| 2024/0053877 | A1 * | 2/2024 | Du | G06F 3/0486 |
| 2024/0098100 | A1 * | 3/2024 | Lal | H04L 63/1416 |
| 2024/0111719 | A1 * | 4/2024 | Gentile | G06F 16/156 |
| 2024/0169068 | A1 * | 5/2024 | Tishbi | G06F 21/577 |
| 2024/0204999 | A1 * | 6/2024 | Tong | H04L 9/0861 |
| 2024/0205238 | A1 * | 6/2024 | Ron | G06F 21/554 |
| 2024/0290435 | A1 * | 8/2024 | Desai | G16B 50/10 |
| 2024/0320124 | A1 * | 9/2024 | Sankaranarayanan | G06N 3/042 |
| 2024/0330446 | A1 * | 10/2024 | Bulut | G06F 21/552 |
| 2024/0333765 | A1 * | 10/2024 | McGrew | G06F 16/334 |
| 2024/0354423 | A1 * | 10/2024 | Mardikar | G06T 19/006 |
| 2024/0386099 | A1 * | 11/2024 | Weizman | G06F 21/577 |
| 2024/0422071 | A1 * | 12/2024 | Delayen | H04L 41/065 |
| 2025/0023901 | A1 * | 1/2025 | Ketharaju | H04L 63/1433 |

(56) References Cited

U.S. PATENT DOCUMENTS

| | | | | |
|---|---|---|---|---|
| 2025/0036775 | A1* | 1/2025 | Jackson | G06N 20/00 |
| 2025/0061195 | A1* | 2/2025 | Salman | G06F 21/554 |
| 2025/0063063 | A1* | 2/2025 | Tishbi | G06F 16/9024 |
| 2025/0138787 | A1* | 5/2025 | Kdoshim | G06F 8/75 |
| 2025/0173165 | A1* | 5/2025 | Lackritz | G06F 9/451 |
| 2025/0175521 | A1* | 5/2025 | Pande | H04L 67/1076 |
| 2025/0209090 | A1* | 6/2025 | Li | G06F 16/9024 |
| 2025/0209156 | A1* | 6/2025 | Sankaran | G06F 21/554 |
| 2025/0209171 | A1* | 6/2025 | Barton | G06F 21/566 |
| 2025/0232039 | A1* | 7/2025 | Gilles | G06F 21/577 |
| 2025/0233792 | A1* | 7/2025 | Ghalya | H04L 41/065 |
| 2025/0298901 | A1* | 9/2025 | Zawadowskiy | G06F 21/577 |
| 2025/0315242 | A1* | 10/2025 | Singh | G06F 8/71 |
| 2026/0023857 | A1* | 1/2026 | White | G06F 21/577 |
| 2026/0032068 | A1* | 1/2026 | Curic | H04L 41/16 |
| 2026/0032143 | A1* | 1/2026 | White | G06F 21/577 |
| 2026/0050823 | A1* | 2/2026 | Agrawal | G06N 20/00 |

* cited by examiner

GRAPH-BASED ARTIFICIAL INTELLIGENCE AGENT

FIELD

The present disclosure relates to cybersecurity, and more particularly to a graph-based artificial intelligence agent for use in cybersecurity.

BACKGROUND

In the cybersecurity industry, Security Operations (SecOps) team or security analysts typically work on identifying and fixing problems or threats in computing systems. For example, a security analyst may analyze risks, vulnerabilities, threats, and incidents related to the networked computing systems and/or cybersecurity systems in general. The security analysts are generally burdened with manually managing complex workflows for threat intelligence, incident response, and other tasks. In order to ease their workload, organizations use security tools and automation systems. Existing automation solutions are often limited and require technical expertise to implement, making them inaccessible to many security analysts.

Therefore, there exists a need for a more intuitive, flexible, and user-friendly assistance system for security analysts.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
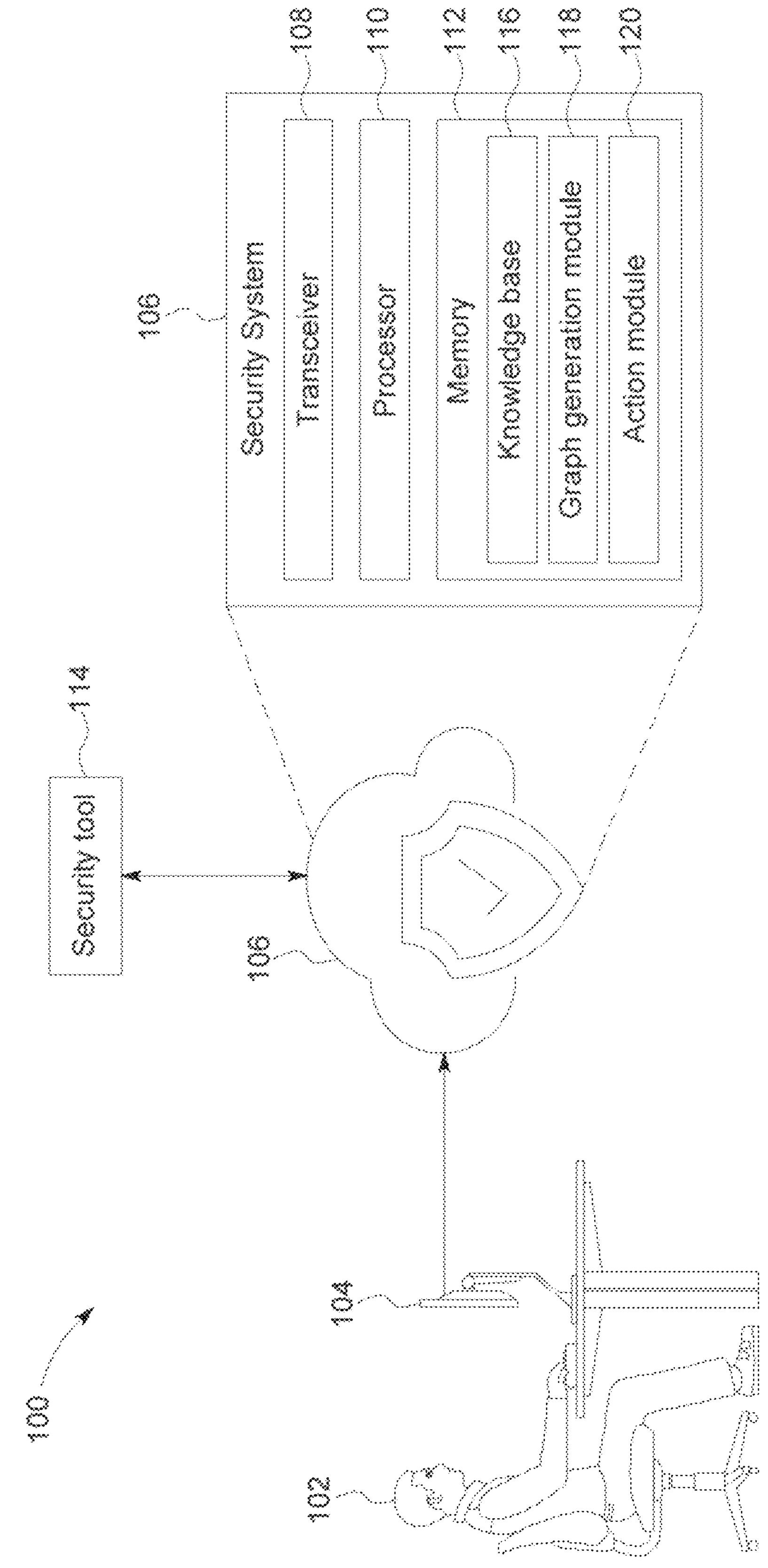
FIG. 1 depicts an example environment in which techniques and structures for providing the systems and methods disclosed herein may be implemented.

The present disclosure describes a system and method to assist a user in investigating and mitigating cyber security threats. The system may generate an interactive graph interface that may interact with the user in real-time to investigate real-time cyber security threats. The system may assist the user to perform hypothesis-based threat hunting by using the interactive graph interface and execute real-time actions.

The actions may include actions to respond, resolve, and mitigate the detected threat(s). The system may be based on large language models (LLMs) and may assist the user in handling the threats efficiently.

The interactive graph interface may represent data associated with a threat alert in a graphical form having a plurality of nodes that may be connected by using a plurality of edges. The interactive graph interface may dynamically create and/or expand nodes and edges when the user interacts with the interactive graph interface. In an exemplary aspect, the plurality of nodes may include a primary node and a set of secondary nodes. The primary node may be associated with the threat alert ("alert") generated by a security tool associated with an organization (for which the system may be performing the cyber security threat hunting and mitigation). The secondary nodes may include one or more hypothesis nodes and entity nodes, which may be associated with the alert (or the primary node). Each hypothesis node may represent a hypothesis that the user may investigate. Each entity node may represent one or more Indicators of Compromise (IOCs) associated with the alert (e.g., IP addresses, domains, URLs, file names or hashes, registry keys, suspicious processes executing on the host, and/or the like).

In some aspects, the system may dynamically generate the interactive graph interface based on a knowledge base. The knowledge base may include a security framework that may include Adversarial Tactics, Techniques, and Common Knowledge (ATT&CK) framework. The security framework may include security entities that may serve as a grounding framework to handle cybersecurity threats. Such entities may include, but are not limited to, tactics, techniques, sub-techniques, mitigations, groups, software, procedures, and/or the like. The knowledge base may further include normalized past or historical investigation steps (e.g., previously formed hypothesis while conducting hypothesis-based hunting). The knowledge base may additionally include threat intelligence nodes connected to tactics, techniques, and procedures (TTPs) and kill chains, with IOCs derived from advisories.

In some aspects, when the user clicks on any secondary node (e.g., any hypothesis or entity node) on the interactive graph interface to further investigate the alert/threat, the interactive graph interface may open further set(s) of hypothesis nodes associated with the selected secondary node. The user may then select another hypothesis node from the further set(s) of hypothesis nodes to continue the investigation. In further aspects, when the user clicks on any secondary node (e.g., any hypothesis or entity node), the interactive graph interface may open one or more action nodes associated with the selected node. The user may select an action node to perform an action via the system.

In some aspects, the system may perform some actions automatically. In further aspects, the system may take approval/confirmation from the user before performing/executing an action. For instance, the system may learn from the past investigation steps or past action steps taken by the user. Based on the learning, the system may either perform an action automatically or may take approval from the user before executing the action. In addition, the system may evaluate characteristics (e.g., operation or profile) associated with the organization via the LLM, evaluate or postulate outcomes/consequences based on certain categorical actions, and then determine whether to perform the action automatically or seek user approval. In some aspects, the system may evaluate characteristics associated with the organization by using unstructured data (e.g., organization policy document) associated with the organization. In further aspects, the interactive graph interface may enable the user to add or edit any node.

The present disclosure discloses an interactive graph interface that may assist a user to handle (e.g., investigate) cyber security threats with ease, and facilitates seamless correlation of entities for faster analysis. The interactive graph interface enables dynamic creation and expansion of nodes for real-time threat investigation, and displays visual correlation of entities for easier pattern recognition and analysis. Further, the present disclosure facilitates in seamless integration of alerts, threat intelligence, and hypotheses into a unified, interactive graph. The unified approach streamlines the entire process from investigation to mitigation, providing a single solution that meets all security use cases without sacrificing depth. The interactive graph interface integrates pivoting, enrichment, containment, and reporting in a single interface. In addition, the system blends AI-driven investigation with human expertise for efficient, thorough analysis. The system further provides personalized, context-aware suggestions based on the specific investigation path, improving workflow efficiency. The system learns from past investigations, improving its knowledge and recommendations over time.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. While explaining FIG. 1, references will be made to FIGS. 2, 3, 4, and 5.

The environment 100 may include a user 102 and a user device 104 associated with the user 102. The user 102 may be a security analyst who analyzes cybersecurity risks, vulnerabilities, threats, and incidents associated with an organization (such as a company, an institution, etc.). Specifically, the user 102 may investigate cybersecurity threats associated with one or more computing systems associated with the organization, and perform mitigation/remedial actions accordingly. In some aspects, the user 102 may investigate the cybersecurity threats (and perform remedial actions) by using the user device 104. The user device 104 may include, for example, a mobile phone, a laptop, a computer, a tablet, a wearable device, or any other device with communication capabilities.

The environment 100 may further include a security system 106 (or a security platform) that may assist the user 102 in handling cybersecurity threats associated with the organization. For example, the security system 106 (or system 106) may assist the user 102 in investigating and mitigating cybersecurity threats associated with the computing systems of the organization. In some aspects, the system 106 may assist the user 102 by creating an interactive graph interface (or an interactive graphical interface). The user 102 may use the interactive graph interface to efficiently handle (e.g., investigate and mitigate) the cybersecurity threats.

In some aspects, the system 106 may communicatively couple with the user device 104 and may assist the user 102 in handling the cybersecurity threats via the user device 104. The system 106 may communicatively couple with the user device 104 via a network (not shown). The network, as described herein, illustrates an example communication infrastructure in which the connected devices discussed in various embodiments of this disclosure may communicate. The network may be and/or include the Internet, a private network, public network or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples. In some aspects, the system 106 may be hosted on a server or a distributed computing system, which may be communicatively coupled with the user device 104. In other aspects, the system 106 may be installed or hosted on the user device 104.

The system 106 may include a plurality of units including, but not limited to, a transceiver 108, a processor 110 and a memory 112. The transceiver 108 may transmit/receive information/data to/from external systems and devices via the network (as an example). For example, the transceiver 108 may receive or transmit inputs/information/data from/to the user device 104. The transceiver 108 may receive the user inputs/prompts (e.g., a user query) in natural language from the user device 104, which enables the user to easily interact with the system 106 in natural language. In alternative aspects, the user query may not be in natural language, and may instead include or be in the form of an image, a document, speech, and/or the like. In further aspects, the transceiver 108 may transmit a notification or an alert to the user device 104. Furthermore, the transceiver 108 may transmit a response to the user prompt (e.g., a response to the user's query in natural language) to the user device 104. Similarly, the transceiver 108 may receive an alert from one or more security tools 114 associated with the organization. In some aspects, the security tool may include an Endpoint Detection and Response (EDR) tool. The EDR tool may monitor and analyze endpoints (such as mobile devices, desktop computers, virtual machines, embedded devices, and servers connected to a network system) for threats, and may generate an alert when the EDR tool detects a threat.

The processor 110 may be in communication with one or more memory devices disposed in communication with the respective computing systems (e.g., the memory 112 and/or one or more external databases not shown in FIG. 1). The processor 110 may utilize the memory 112 to store programs in code and/or to store data for performing aspects in accordance with the disclosure. The memory 112 may be a non-transitory computer-readable storage medium or memory storing a program code that enables the processor 110 to perform operations in accordance with the present disclosure. The memory 112 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The memory 112 may include a plurality of components including, but not limited to, a knowledge base 116, a graph generation module 118, an action module 120, and/or the like. The system 106 may use the knowledge base 116 to investigate threats (or perform threat hunting) and mitigate the threats, as described later in the present disclosure. The graph generation module 118 and the action module 120 may include/store computer instructions and/or algorithms, which may be executed by the processor 110 to perform operations in accordance with the present disclosure. In some aspects, one or more modules described above may be stored outside the memory 112. Further, one or more modules may include large language models (LLMs) or agentic LLMs to perform their respective tasks. The details of these modules are described later in the description below.

The knowledge base 116 may include a security framework that may include Adversarial Tactics, Techniques, and Common Knowledge (ATT&CK) framework such as MITRE ATT&CK®. The ATT&CK framework may be a model for cyber adversary behavior, reflecting the various phases of an adversary's attack lifecycle and the platforms they are known to target.

In some aspects, the security framework may include security entities that may serve as a grounding framework to handle the cybersecurity threats. Such entities may include, but are not limited to, tactics, techniques, sub-techniques, mitigations, groups, software, procedures, and/or the like. The tactics represent objectives or goals of an attacker, (e.g., "why" the attackers are performing an attack). Examples include initial access, execution, persistence, privilege escalation, defense evasion, credential access, discovery, lateral movement, collection, command and control, exfiltration, impact, etc. The techniques represent actions that an attacker performs to achieve their objectives, e.g., "how" the attackers may be performing an attack. Examples include spear phishing attachment, drive-by compromise, exploitation for client execution, system network configuration discovery, remote file copy, data encrypted for impact, etc. The sub-techniques represent specific methods used by the attackers. The sub-techniques are more detailed breakdown of the techniques. Mitigations represent steps that may be taken to prevent or handle an attack. Examples include, but are not limited to, limit access to resource over the network, network intrusion prevention, user training, and/or the like. Groups may include sets of related intrusion activities that are tracked by a common name in the security community. Examples include APT28, APT29, Lazarus Group, etc. Software represents the specific tools or pieces of software used by the attackers. This includes various types of malware, but may also include security utilities and dual-use administrative tools that the attackers may use. Procedures represent descriptions of actions taken by a threat actor or software during a technique or sub-technique.

In further aspects, the knowledge base 116 may include normalized past or historical investigation steps (e.g., previously formed hypothesis while conducting hypothesis-based hunting). In some aspects, the normalized past investigation steps (or hypothesis) may be associated with successful threat hunts. In further aspects, the normalized past investigation steps (or hypothesis) may be associated with the organization. For example, the normalized past investigation steps may include past hypothesis formed by the user 102 associated with the organization. In other aspects, the normalized past investigation steps (or hypothesis) may be associated with public security data and may not be specific to the organization.

The knowledge base 116 may further include threat intelligence nodes connected to tactics, techniques, and procedures (TTPs) and kill chains, with Indicators of Compromise (IOCs) derived from advisories, enabling correlation with ongoing investigations. In some aspects, the knowledge base 116 may include a knowledge graph that may include nodes that represent IOCs and edges that represent IOC relations. The IOC may be evidence left behind by an attacker or malicious software that may be used to identify a security incident. The IOC may include network-based IOCs (e.g., malicious IP addresses, domains, or URLs), Host-based IOCs (e.g., file names or hashes, registry keys, or suspicious processes executing on the host), Behavioral IOCs (login patterns, network traffic patterns), etc.

In some aspects, the processor 110 may obtain the threat intelligence feed/data (e.g., threat advisories) automatically from an external source via the transceiver 108 (such as an open cyber threat intelligence (OpenCTI) platform, threat advisories or documents, and/or the like.). The threat intelligence feed may include unstructured data having real-time or near-real-time insights into emerging attacks, which may include IOCs as well as information on the TTPs used by threat actors. Responsive to obtaining the unstructured data from the external source, the processor 110 may convert the unstructured data into the knowledge graph, and store the information associated with the threat intelligence feed/data in the knowledge base 116.

In further aspects, the knowledge base 116 may include organization specific information. The organization specific information may include, for example, personalized information associated with the organization. In some aspects, the organization specific information may include an unstructured document (e.g., organization policy document). In further aspects, the organization specific information may include organization-specific alert nodes connected to the associated TTPs and kill chains. The processor 110 may use LLMs to analyze the unstructured data/document to use the unstructured data in handling the threats.

In operation, the processor 110 may obtain the alert generated by the security tool 114, via the transceiver 108. In some aspects, the security tool 114 may generate the alert when the security tool 114 detects anomalous activities or patterns that suggest a potential security threat (e.g., communication with known malicious IP addresses), and transmit the alert to the transceiver 108. Responsive to obtaining the alert, the processor 110 may use the instructions stored in the graph generation module 118 to generate an interactive graph interface 200 (shown in FIG. 2). In some aspects, the processor 110 may generate the interactive graph interface 200 based on the obtained alert and the knowledge base 116.

The system 106 may assist the user 102 to perform hypothesis-based threat hunting (or hypothesis-based hunting) by using the interactive graph interface 200. The hypothesis-based hunting may be tailored to specific organization's needs or situational awareness. This technique involves forming a hypothesis about a potential threat based on current threat intelligence, industry trends, or vulnerabilities within the computing infrastructure, which may act as a starting point for further investigation.

In some aspects, the hypothesis-based hunting may include the step of forming a hypothesis about the alert generated by the security tool 114. The hypothesis may be a statement of an idea or an explanation to test against data. For example, the threat hypothesis may be, "if the attacker were to compromise a user's credentials, the attacker would likely login from a different geo location than the legitimate user", which needs to be further investigated against the data to detect the threat. Thus, when the system 106/user 102 forms a hypothesis about the alert, a system user (e.g., the user 102) and/or the system 106 may need to investigate the hypothesis. For instance, to investigate the hypothesis, a user or a system may search remote login combinations where organization's users would have to travel faster than should be possible, and may remove all events that could be part of a user's normal commute. Responsive to conducting the search, the user or the system may confirm whether the hypothesis is correct or incorrect. When the hypothesis is incorrect, the user or the system may revise the formed hypothesis or use another hypothesis.

The interactive graph interface 200 may include a visual representation of data, which may assist the user 102 to investigate the threat (associated with the alert) and take mitigation actions. The interactive graph interface 200 may include a plurality of nodes and a plurality of edges. The edges may indicate logical relationship or connections between the nodes. Since the interactive graph interface 200 is interactive in nature, the user 102 may interact/click on any node to get deeper insights associated with the node. When the user 102 clicks on any node, the interactive graph interface 200 may dynamically update/expand to include new nodes and edges associated with the clicked node (and may display relation of the new nodes and edges with the old/existing nodes and edges). The user 102 may use the interactive graph interface 200 to investigate threat or threat alert generated by the security tool. The user 102 may interact with the interactive graph interface 200 to add new nodes or edit existing nodes, as described later in the present disclosure.

The plurality of nodes may include a primary node and a set of secondary nodes. The primary node may include an alert node 202. The secondary nodes may include a first set of hypothesis nodes 204*a*, 204*b*, and a plurality of entity nodes 206*a*, 206*b*. The alert node 202 may represent (or correspond to) the alert generated by the security tool. Each hypothesis nodes 204*a*, 204*b* may represent a hypothesis associated with the alert that may be investigated by the user 102. In some aspects, each hypothesis node 204*a*, 204*b* may include hypothesis text detailing potential malicious activity. Each hypothesis node 204*a*, 204*b* may also include associated queries and query results, if applicable. In some aspects, the hypothesis nodes 204*a*, 204*b* provide next-step suggestions based on likely attack patterns or kill chains. Each entity nodes 206*a*, 206*b* may represent the IOC associated with the alert (e.g., IP addresses, domains, URLs, file names or hashes, registry keys, suspicious processes executing on the host, etc.).

Figure 2:
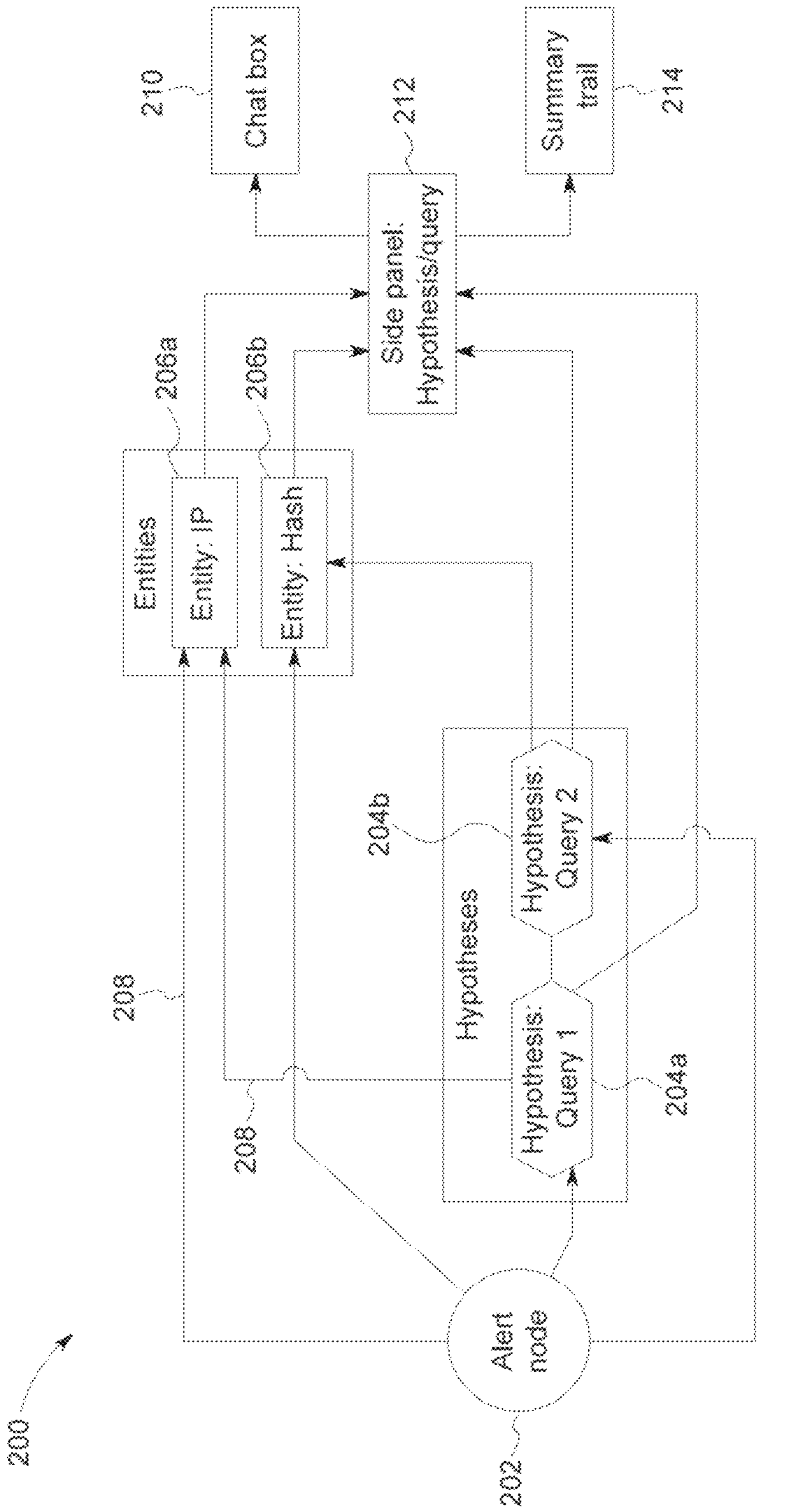
FIG. 2 depicts an example schematic diagram of an interactive user interface in accordance with the present disclosure.

The secondary nodes may be connected to the primary node via edges 208. In further aspects, one or more secondary nodes may be connected amongst themselves via the edges 208. In an exemplary aspect, the alert node 202 may be connected to each hypothesis node 204*a*, 204*b* and each entity node 206*a*, 206*b* via the edges 208. In addition, each hypothesis node 204*a*, 204*b* may be connected to the associated entity node 206*a*, 206*b* via the edges 208, as shown in FIG. 2. Stated another way, the interactive graph interface 200 may include the connection between the first set of hypothesis nodes 204*a*, 204*b* and the first set of entity nodes 206*a*, 206*b*. For example, when a hypothesis is formed based on a malicious IP address, the hypothesis node associated with the hypothesis may show a connection between the hypothesis node and the entity node representing the malicious IP address. Responsive to generating the interactive graph interface 200, the processor 110 may render the interactive graph interface 200 on the user interface associated with the user device 104, via the graph generation module 118.

In some aspects, the processor 110 may automatically generate the alert node 202 based on the alert generated by the security tool 114, and may label (or provide a name to) the alert node 202. In other aspects, the user 102 may generate the alert node 202 in the interactive graph interface 200 when the security tool generates the alert and may label the alert node 202. In some aspects, the processor 110 may enrich the alert node 202 with data from sources such as VirusTotal, ReallyFreeGeoIP, internal databases, and other relevant repositories.

The processor 110 may dynamically generate the secondary nodes based on the primary node (or the alert node 202), and may label (or provide names to) the secondary nodes, to facilitate the user 102 in investigating the hypothesis. The user 102 may collaborate with the interactive graph interface 200 (e.g., the secondary nodes) to conduct deeper investigation. In other aspects, the user 102 may generate one or more secondary nodes in the interactive graph interface 200. In further aspects, the processor 110 may automatically generate the secondary nodes based on the knowledge base 116. Specifically, the processor 110 may generate the hypothesis node 204*a*, 204*b* based on the knowledge base 116. In addition, the processor 110 may generate the entity nodes 206*a*, 206*b* based on the knowledge base 116. For instance, to generate the entity nodes 206*a*, 206*b*, the processor 110 may extract IOCs associated with the alert by using the knowledge base 116 and generate the entity nodes 206*a*, 206*b* using the extracted IOCs.

In some aspects, the processor 110 may select and generate the first set of hypothesis nodes 204*a*, 204*b* from a list of a plurality of hypothesis nodes based on the knowledge base 116 (and the alert generated by the security tool). As an example, the processor 110 may select the first set of hypothesis nodes 204*a*, 204*b* based on the security framework included in the knowledge base 116. As another example, the processor 110 may select the first set of hypothesis nodes 204*a*, 204*b* (or relevant hypothesis nodes) based on the past or historical investigation steps stored in the knowledge base 116, which may significantly speed up the threat hunting process. The historical investigation steps may have been performed by the user 102 (or any other user) in the past, which may have facilitated the user 102 to successfully detect the threat in the past. In some aspects, the processor 110 may automatically link the IOCs from threat intelligence and past alerts with IOCs associated with the alert generated by the security tool 114, enabling quick correlation with current investigations for enhanced threat detection. As yet another example, the processor 110 may select the first set of hypothesis nodes 204*a*, 204*b* based on the organization-specific information stored in the knowledge base 116. In further aspects, the processor 110 may determine a risk factor associated with the alert/threat, and select the first set of hypothesis nodes 204*a*, 204*b* based on the determined risk factor. In some aspects, the processor 110 may generate a list or a plurality of hypothesis nodes but may display only a set of hypothesis nodes on the user interface (e.g., based on the risk factor), and may hide or not display the remaining generated nodes. The user 102 may use expand buttons on the user interface to view all the generated nodes, if required. For instance, when the alert is associated with an endpoint device of administrator of the organization, the risk factor may be high.

An example of the operation that the processor 110 performs to generate the interactive graph interface 200 is described below. The example described below should not be construed as limiting.

In an exemplary aspect, the processor 110 may first obtain the alert from the security tool, which may be associated with a phishing email with a winmail.exe file. The processor 110 may generate the alert node 202 (associated with the phishing email) responsive to obtaining the alert. The processor 110 may then generate the entity nodes 206*a*, 206*b* that may represent an IP address associated with the phishing email, email address, winmail.exe file, etc. The processor 110 may dynamically generate, via the graph generation module 118 that may use one or more LLMs, the hypothesis nodes 206*a*, 206*b* based on the information associated with the alert and the knowledge base 116. For instance, based on the winmail.exe file and the knowledge base 116, the processor 110 may form hypothesis nodes such as, "Would you like to explore whether any processes are created", "Do you want to see any impact on network traffic", "Do you want to see if this file loaded any library from the Dynamic-link library (DLL)", etc. The processor 110 may then render the interactive graph interface 200, including the alert node 202, the hypothesis nodes 206*a*, 206*b* and the entity nodes 206*a*, 206*b*, on the user interface associated with the user device 104.

Responsive to rendering the interactive graph interface 200 on the user interface, the processor 110 may obtain a first user input indicative of a selection of a first secondary node from the first set of secondary nodes via the user interface. Specifically, the user 102 may select the first secondary node when the user device 104 displays the interactive graph interface 200 on the user interface. The processor 110 may perform an action based on the first user input by using the instructions stored in the action module 120. For instance, the user 102 may select the hypothesis node 204*a* to further investigate the threat/alert. When the user 102 selects the hypothesis node 204*a*, the processor 110 may perform an action associated with the hypothesis node 204*a*, as described below.

In some aspects, the action may include dynamic generation of a set of tertiary nodes based on the first user input (or responsive to the user selection of the first secondary node), and rendering of the set of tertiary nodes (shown in FIG. 3) on the user interface. The set of tertiary nodes may include a second set of hypothesis nodes. For instance, the processor 110 may generate the second set of hypothesis nodes when the user 102 clicks on the hypothesis node 204*a* or the hypothesis node 204*b*. Alternatively, the processor 110 may generate the second set of hypothesis nodes when the user 102 clicks on the entity node 206*a* or the entity node 206*b*. The processor 110 may generate the second set of hypothesis nodes based on the selected secondary node (e.g., based on the selected hypothesis node or current investigation trail) and the knowledge base 116. The second set of hypothesis nodes may be a sub-node associated with the selected secondary node (or the selected hypothesis node). For instance, when the user 102 selects the hypothesis node "would you like to explore whether any processes are created?", the processor 110 may create sub-nodes under the selected hypothesis node to investigate the threat. The user 102 may select any sub-node to perform further investigation.

Figure 5:
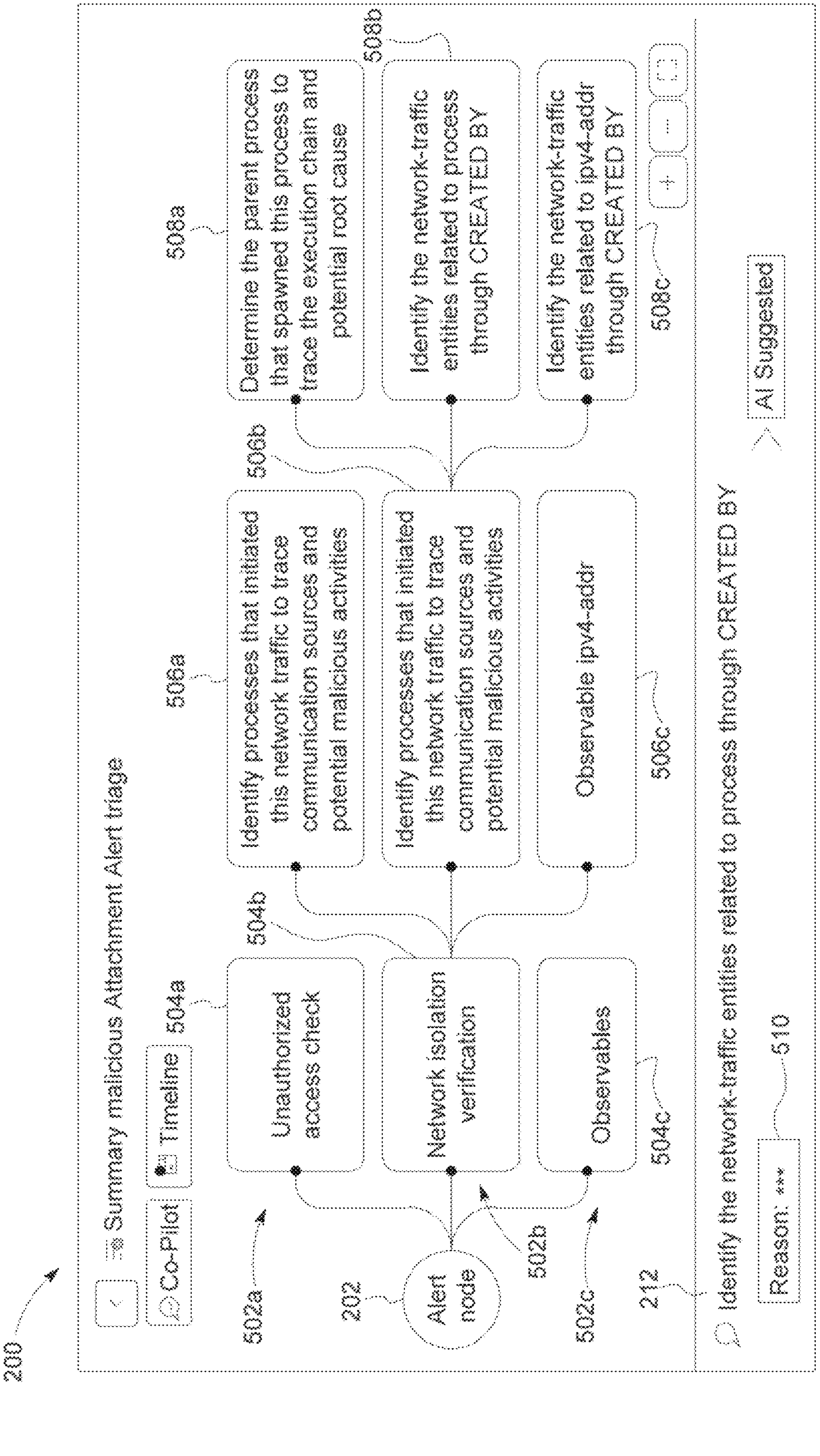
FIG. 5 depicts a third snapshot of an interactive user interface in accordance with the present disclosure.

In some aspects, the secondary node(s) may include one or more hypotheses node chains 502*a*, 502*b*, and 502*c* (as shown in FIG. 5). Each hypotheses node chain may include a first level hypothesis node 504*a*, 504*b*, 504*c*, and one or more second level hypothesis nodes 506*a*, 506*b*, 506*c*, 508*a*, 508*b*, 508*c* associated with the first level hypothesis node 504*a*, 504*b*, 504*c*. The second level hypothesis nodes may be connected to the first level hypothesis node. Each hypothesis node may represent a hypothesis, to be further investigated by a user, associated with the alert (similar to the hypothesis node 204*a*, 204*b*). The first level hypothesis node may be an initial/high level hypothesis and the second level hypothesis nodes may be a sub-hypothesis node associated with the first level hypothesis node.

In some aspects, the user 102 may investigate (or validate) the second level hypothesis node(s) to investigate (or validate) the first level hypothesis node. In some aspects, the processor 110 may generate the hypotheses node chain(s) 502*a*, 502*b*, and 502*c* based on the primary node (or the alert node 202). In some aspects, each hypotheses node chain may include three hypothesis nodes (e.g., nodes 504*a*, 506*a*, 508*a*) that may be rendered simultaneously on the user interface, as shown in FIG. 5. Alternatively, each hypotheses node chain may include more or less than three hypothesis nodes.

In some aspects, responsive to rendering the hypotheses node chains 502*a*, 502*b*, 502*c* on the user interface, the processor 110 may obtain a user input indicative of a selection of a first secondary node from the first set of secondary nodes, and perform the action (e.g., generation of the second set of hypothesis nodes) based on the user input. In some aspects, the first secondary node may be the first level hypothesis node or the second level hypothesis node. For instance, when the user 102 clicks on any node (e.g., the first level hypothesis node (504*a*, 504*b*, or 504*c*, or any second level hypothesis nodes 506*a*, 506*b*, 506*c*, 508*a*, 508*b*, or 508*c*), the processor 110 may generate the second set of hypothesis nodes associated with the node selected/clicked by the user 102, in the similar manner as described above. For example, when the user 102 clicks on any hypothesis node, the processor 110 may generate the next hypothesis node associated with the selected/clicked hypothesis node.

In further aspects, the processor 110 may generate and display a reason 510 for the generation of each hypothesis node in a side panel 212, as shown in FIG. 5. In some aspects, the processor 110 may generate a list or a plurality of hypotheses node chains but may display only one or more (or a subset of) hypothesis hypotheses node chains on the user interface (e.g., based on the risk factor), and may hide or not display the remaining generated node chains, based on the knowledge base 116.

Thus, the processor 110 may dynamically generate a plurality of "investigation paths" for the user 102 on the user interface. An investigation path may connect a hypothesis node or an entity node with one or more sub-nodes (e.g., one or more additional hypothesis nodes and/or entity nodes) in a sequential manner. In some aspects, each investigation path hypotheses node chain may be referred to as the investigation path. The user 102 may select any investigation path (or the hypotheses node chain) from the plurality of investigation paths based on the likelihood of successfully detecting the threat. For instance, a first investigation path may include the hypothesis node 204*a* (and respective sub-nodes), a second investigation path may include the hypothesis node 204*b* (and respective sub-nodes), a third investigation path may include the entity node 206*a* (and respective sub-nodes), a fourth investigation path may include the entity node 206*b* (and respective sub-nodes), and so on. In some aspects, the processor 110 may select a set of investigation paths based on the alert and the knowledge base 116 and display the selected investigation paths on the user interface as part of the interactive graph interface 200. In further aspects, the processor 110 may provide/display a recommendation of selecting a specific investigation path (or node) to the user 102 on the interactive graph interface 200 based on the alert and the knowledge base 116. For instance, the processor 110 may provide the recommendation based on the past investigation steps performed by the user 102 (or another user) in a similar scenario (e.g., for a similar threat) that led to a successful threat hunt in the past. In some aspects, the processor 110 may provide the recommendation when a confidence value associated with the likelihood of successfully detecting the threat by using the investigation path may be greater than a threshold value.

In further aspects, the action may include generation of one or more action nodes 302*a*, 302*b* (as the set of tertiary nodes, shown in FIG. 3) based on the selection of the first secondary node and the knowledge base 116, and rendering the action nodes 302*a*, 302*b* on the interactive graph interface 200. In an exemplary aspect, the action nodes 302*a*, 302*b* may be associated with the first secondary node that the user 102 selects. In some aspects, the action nodes 302*a*, 302*b* may be associated with the hypothesis nodes 204*a*, 204*b* or the entity nodes 206*a*, 206*b*. The action nodes 302*a*, 302*b* may be associated with at least one of: a pivot action, a containment action, an enrichment action, a path analysis or a reporting action, an eradication action, a recovery action, and/or the like.

The actions (associated with the action nodes 302*a*, 302*b*) described above may include actions to respond, resolve, and mitigate the detected threat(s). For example, the pivot actions may include getting parent process and analyzing the network traffic; the containment action may include blocking hash or block user; the enrichment action may include getting geolocation data, reputation score; the path analysis action may include analysis for beaconing attacks; the eradication action may include removing all malicious components from affected systems, including malware, compromised accounts, etc.; the recovery action may include restoring altered or deleted files to their original state; the reporting action may include generation of investigation summary or post-mortem report, and/or the like.

In some aspects, responsive to rendering the action nodes on the interactive graph interface 200 as described above, the processor 110 may receive a second user input indicative of a selection of a first action node from the rendered action nodes, and cause the security tool (or any other tool) to perform a first action associated with the first action node based on second user input. In this case, the user 102 may select the first action node as the user 102 may believe that the first action associated with the first action node may be the best action/approach to mitigate the threat. Alternatively, the processor 110 may automatically select a second action node from the rendered action nodes based on the knowledge base 116, and cause the security tool to perform a second action associated with the second action node. In this case, the processor 110 may automatically select the best action node for execution based on the knowledge base 116. It may be appreciated from the description above that the processor 110 may perform or select some actions automatically, and may perform or select other actions based on user input/preference (or responsive to obtaining a user approval/confirmation).

For instance, the processor 110 may learn from the past investigation steps or past action steps taken by the user 102, via the LLM. Based on the learning, the processor 110 may either perform the action(s) automatically, and/or may take approval/confirmation from the user 102 before selecting and executing an action. In an example, the processor 110 may access the knowledge base 116 (e.g., the organization specific information such as company policy document), evaluate characteristics (e.g., operation or profile) associated with the organization via the LLM, evaluate or postulate outcomes/consequences based on certain categorical actions, and then determine whether to perform the action automatically or seek user approval. For instance, when the processor 110 evaluates that blocking a port or firewall may cause negative consequences, the processor 110 may seek user approval before blocking the port or firewall. In another example, the processor 110 may observe that the processor 110 has taken an action automatically, and the user 102 has undone the action. Based on such observation, the processor 110 may not take such action in future automatically and may seek user approval before executing such actions. On the other hand, when the processor 110 observes that the user 102 always take a specific action in a specific scenario, the processor 110 may automatically perform such action.

Figure 3:
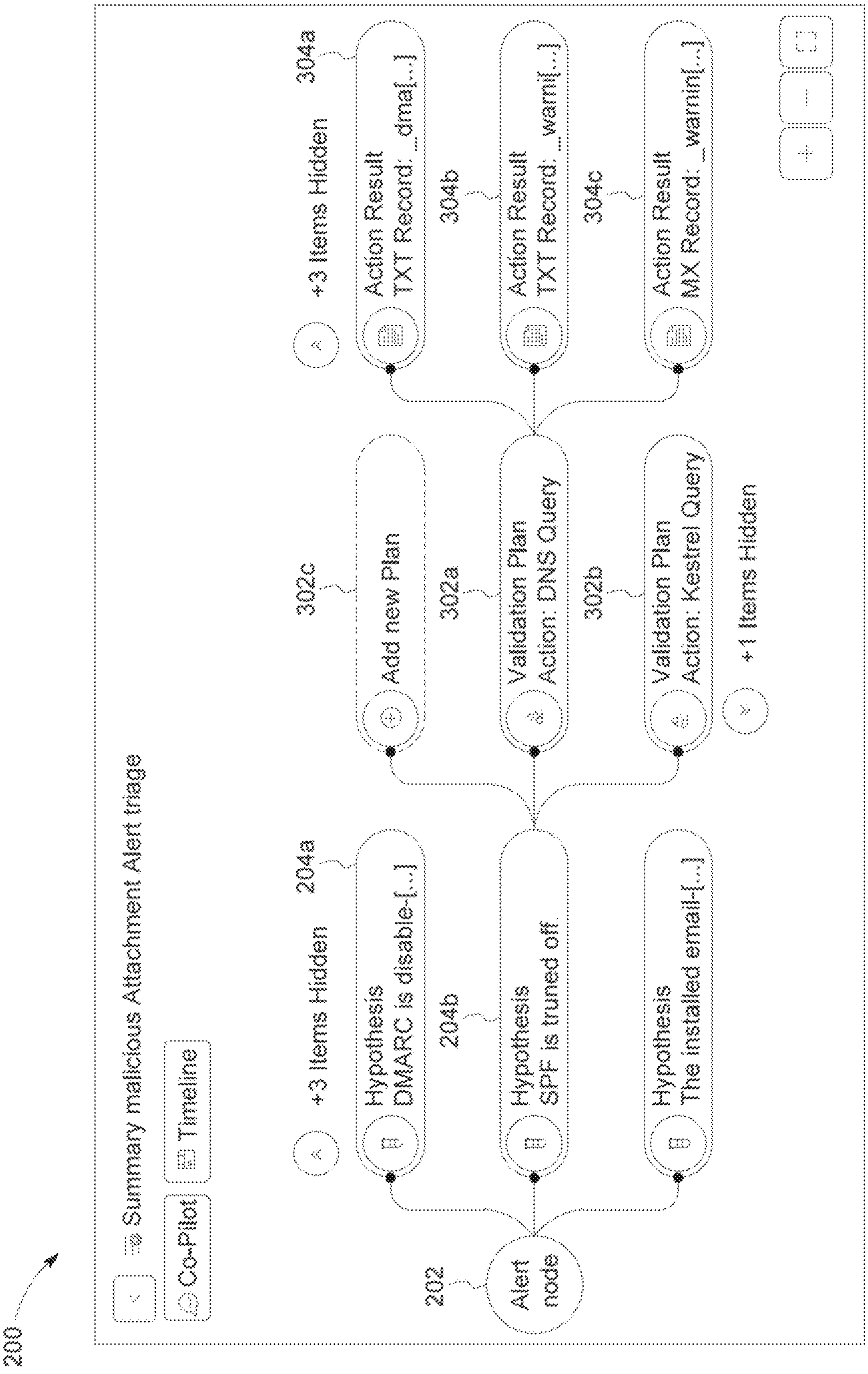
FIG. 3 depicts a first snapshot of an interactive user interface in accordance with the present disclosure.
Figure 4:
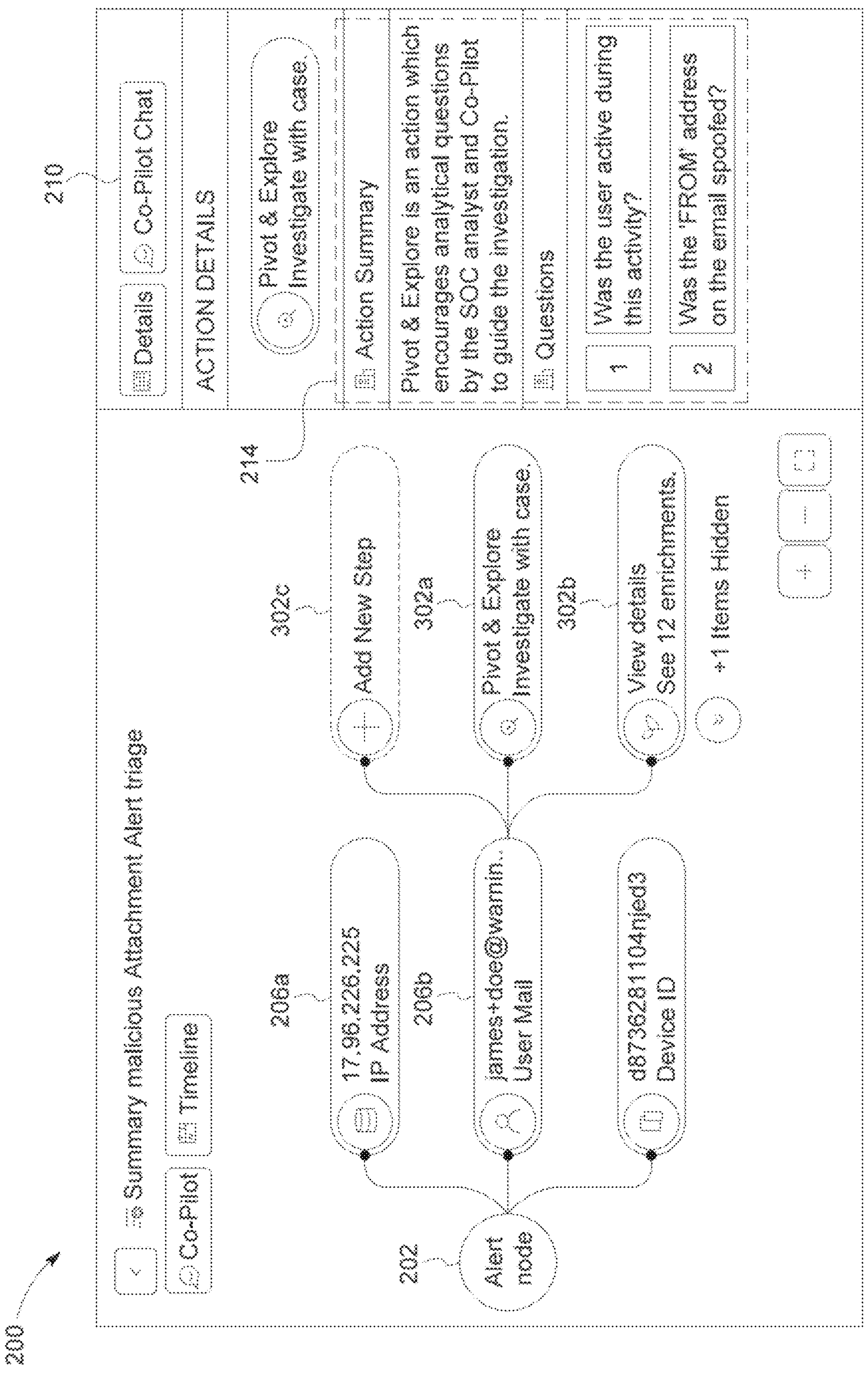
FIG. 4 depicts a second snapshot of an interactive user interface in accordance with the present disclosure.

In some aspects, the processor 110 may further enable the user 102 to add a new action node under a secondary node, as shown by a block/node 302*c* in FIG. 3. In further aspects, the user 102 may edit an existing action node. Furthermore, when the user 102 clicks on any action node, the processor 110 may cause the security tool 114 to perform the selected action, and may display results associated with the selected action node as sub-nodes 304*a*, 304*b*, 304*c*, shown in FIG. 3.

In some aspects, when the user 102 desires to add a new secondary node (e.g., new hypothesis node with custom queries, text, and results) in the interactive graph interface 200, the processor 110 may obtain a first user request from the user device 104 to add the new secondary node. Responsive to obtaining the first user request, the processor 110 may generate the new secondary node, and render the new secondary node in the interactive graph interface 200. In further aspects, the processor 110 may obtain a second user request from the user device 104 to edit (or delete) the first secondary node (or an existing secondary node) in the interactive graph interface 200. Responsive to obtaining the second user request, the processor 110 may generate an updated first secondary node, and render the updated first secondary node in the interactive graph interface 200.

In other aspects, the processor 110 may obtain a third user request from the user device 104 to display a copilot chat window 210 that may enable the user 102 to ask queries to guide further investigation. Responsive to obtaining the third user request, the processor 110 may display the copilot chat window 210 on the interactive graph interface 200. The user 102 may use the copilot chat window 210 when the user 102 requires further assistance in investigating the alert. The user 102 may input a user query in natural language in the copilot chat window 210, and seek responses from the system 106. In alternative aspects, the user query may not be in natural language, and may instead include or be in the form of an image, a document, speech, and/or the like. The copilot chat window 210 may retain the full context of the alert, investigation history, and the knowledge base 116.

In further aspects, the processor 110 may open a side panel 212 in the interactive graph interface 200 when the user 102 clicks on any node. For instance, when the user 102 clicks on the hypothesis node 204*a*, the processor 110 may open the side panel 212. The side panel 212 may include information associated with the clicked node including, but not limited to, title, text, and description in one tab with query and result details in another. The side panel 212 may display results as a data frame if more than two entries exist, otherwise in a key-value format. In further aspects, the side panel 212 may include the reasons for selecting/generating the node (e.g., the hypothesis node 204*a*). For example, the side panel 212 may indicate that the reason for generating the hypothesis node 204*a* is the winmail.exe file and past investigation steps from successful historical threat hunts. In addition, the side panel 212 may include the reasons for generating each action node.

In further aspects, every node (e.g., the hypothesis nodes 204*a*, 204*b*, the entity nodes 206*a*, 206*b*, the sub-nodes, etc.) may include a summary creation option to summarize the investigation trail up to the respective node. When the user 102 clicks on the summary creation option, the processor 110 may generate the summary of investigation up to that node, and display the summary on the interactive graph interface 200 (as shown in block 214 of FIG. 2). In some aspects, the summary of investigation may include action summary associated with the selected action node.

In further aspects, the processor 110 may store the summary of the investigation in the memory 112. In some aspects, the processor 110 may continuously update the knowledge base 116 based on the investigation steps taken by the user 102 (e.g., the first user input), which may be utilized by the processor 110 in future investigations. The system 106 is a continuously learning system, leveraging both public security data and past investigations to enhance its intelligence.

Figure 6:
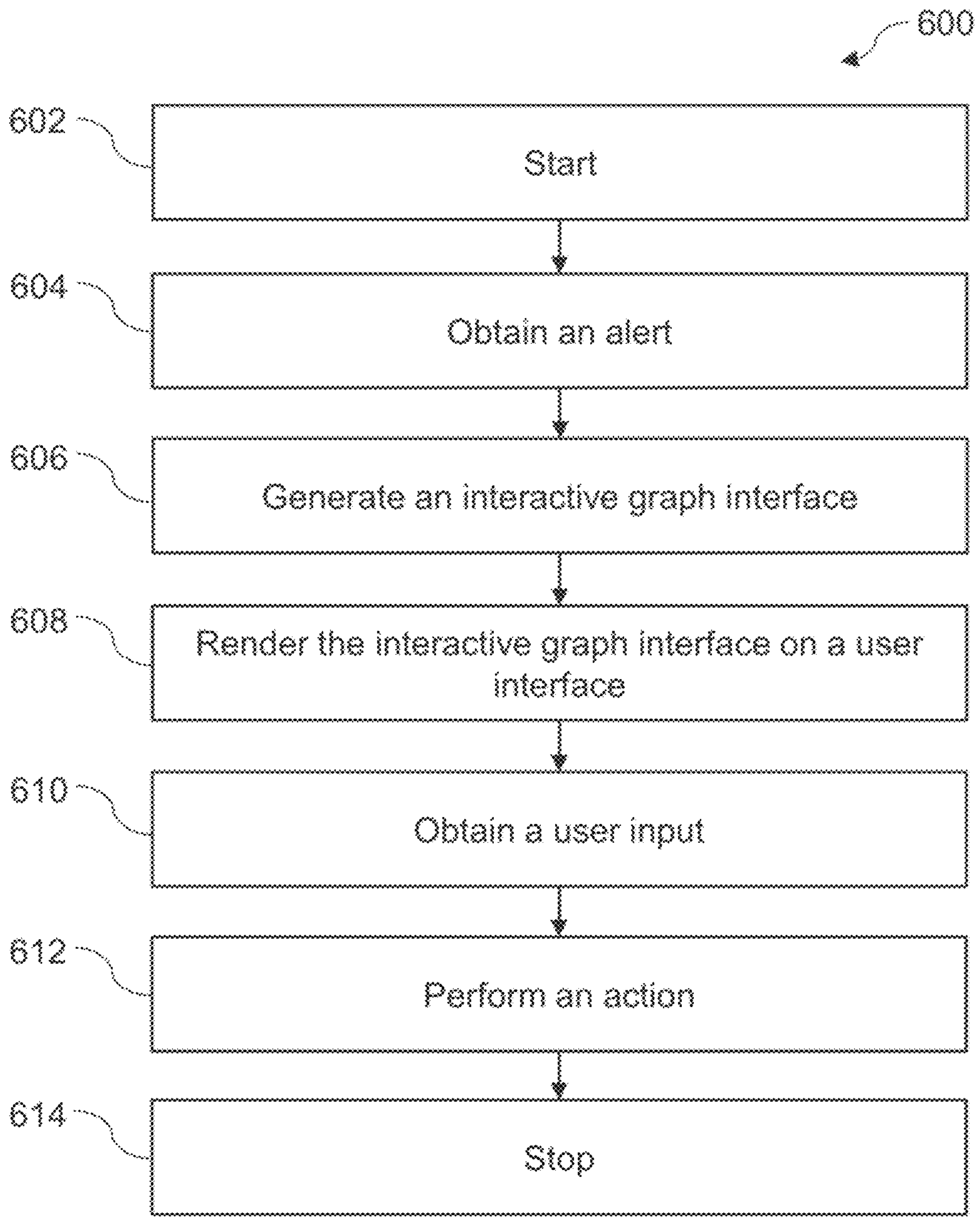
FIG. 6 depicts a flow diagram of an example method to investigate cyber security threats in accordance with the present disclosure.

FIG. 6 depicts a flow diagram of an example method 600 to investigate threats in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 includes obtaining, by the processor 110, the alert from the security tool (e.g., EDR). At step 606, the method 600 includes generating, by the processor 110, the interactive graph interface 200 responsive to obtaining the alert. The interactive graph interface 200 may include the primary node (e.g., the alert node 202) associated with the alert, and a first set of secondary nodes connected to the primary node via the edges 208. The first set of secondary nodes may include the first set of hypothesis nodes 204*a*, 204*b* and a first set of entity nodes 206*a*, 206*b*, as described above. In some aspects, the first set of secondary nodes may include a set of hypotheses node chains. Each hypotheses node chain may include a first level hypothesis node and a second level hypothesis node associated with the first level hypothesis node. Each hypothesis node represents a hypothesis, to be further investigated by the user 102, associated with the alert.

At step 608, the method 600 includes rendering, by the processor 110, the interactive graph interface 200 on the user interface associated with the user device 104. At step 610, the method 600 includes obtaining, by the processor 110, a first user input indicative of a selection of a first secondary node from the first set of secondary nodes via the user interface. At step 612, the method 600 includes performing, by the processor 110, an action based on the first user input.

At step 614, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
- a transceiver configured to receive an alert from a security tool associated with an organization; and
- a processor configured to:
  - obtain the alert from the transceiver;
  - generate an interactive graph interface responsive to obtaining the alert, wherein the interactive graph interface comprises:
    - a primary node corresponding to the alert, and
    - a first set of secondary nodes that is connected to the primary node, wherein the first set of secondary nodes comprises:
      - a first set of hypotheses node chains, wherein each hypotheses node chain comprises a first level hypothesis node and a second level hypothesis node associated with the first level hypothesis node, wherein each hypothesis node represents a hypothesis, to be further investigated by a user, associated with the alert, and wherein the processor selects and generates the first set of hypotheses node chains from a list of hypotheses node chains based on a knowledge base;
  - render the interactive graph interface on a user interface;
  - obtain a first user input indicative of a selection of a first secondary node from the first set of secondary nodes via the user interface; and
  - perform an action based on the first user input.

2. The system of claim 1, wherein the first set of secondary nodes further comprises a first set of entity nodes, and wherein each entity node represents an Indicator of Compromise (IOC) associated with the alert.

3. The system of claim 1, wherein the processor is further configured to generate the primary node based on the alert.

4. The system of claim 1, wherein the processor is further configured to dynamically generate the first set of secondary nodes based on the primary node.

5. The system of claim 1, wherein the knowledge base comprises one or more normalized historical investigation steps.

6. The system of claim 1, wherein the knowledge base comprises an Adversarial Tactics, Techniques, and Common Knowledge (ATT&CK) framework.

7. The system of claim 1, wherein the knowledge base comprises organization specific information associated with the organization.

8. The system of claim 1, wherein the processor is further configured to continuously update the knowledge base based on the first user input.

9. The system of claim 1, wherein the first secondary node comprises the first level hypothesis node or the second level hypothesis node, wherein the action comprises a dynamic generation of a second set of hypothesis nodes responsive to the selection of the first secondary node, and wherein the action further comprises rendering of the second set of hypothesis nodes on the interactive graph interface.

10. The system of claim 9, wherein the processor is configured to generate the second set of hypothesis nodes based on the selection of the first secondary node and the knowledge base.

11. The system of claim 1, wherein the action comprises generation of one or more action nodes based on the selection of the first secondary node and the knowledge base, and wherein the action further comprises rendering of the one or more action nodes on the interactive graph interface along with a reason for generating each action node.

12. The system of claim 11, wherein the processor is further configured to:
- receive, via the interactive graph interface, a second user input indicative of a selection of a first action node from the one or more action nodes; and
- cause the security tool to perform a first action associated with the first action node based on the second user input.

13. The system of claim 11, wherein the processor is further configured to:
- automatically select a second action node from the one or more action nodes based on the knowledge base; and
- cause the security tool to perform a second action associated with the second action node.

14. The system of claim 11, wherein the one or more action nodes are associated with at least one of: a pivot action, a containment action, an enrichment action, or a reporting action.

15. The system of claim 1, wherein the processor is further configured to:
- obtain a first user request to add a new secondary node in the interactive graph interface;
- generate the new secondary node responsive to obtaining the first user request; and
- render the new secondary node on the interactive graph interface.

16. The system of claim 1, wherein the processor is further configured to:
- obtain a second user request to edit the first secondary node in the interactive graph interface;
- generate an updated first secondary node responsive to obtaining the second user request; and
- render the updated first secondary node in the interactive graph interface.

17. The system of claim 1, wherein the processor is further configured to:
- obtain a third user request to display a copilot chat window that enables the user to ask queries to guide further investigation; and
- display the copilot chat window responsive to obtaining the third user request.

18. A method comprising:
- obtaining, by a processor, an alert from a security tool associated with an organization;
- generating, by the processor, an interactive graph interface responsive to obtaining the alert, wherein the interactive graph interface comprises:
  - a primary node corresponding to the alert, and
  - a set of secondary nodes that are connected to the primary node, wherein the set of secondary nodes comprises:
    - a set of hypotheses node chains, wherein each hypotheses node chain comprises a first level hypothesis node and a second level hypothesis node associated with the first level hypothesis node, wherein each hypothesis node represents a hypothesis, to be further investigated by a user, associated with the alert, and wherein the set of hypotheses node chains is selected and generated from a list of hypotheses node chains based on a knowledge base;

rendering, by the processor, the interactive graph interface on a user interface;

obtaining, by the processor, a user input indicative of a selection of a first secondary node from the set of secondary nodes via the user interface; and performing, by the processor, an action based on the user input.

19. A non-transitory computer-readable storage medium having instructions stored thereupon which, when executed by a processor, cause the processor to:

obtain an alert from a security tool associated with an organization;

generate an interactive graph interface responsive to obtaining the alert, wherein the interactive graph interface comprises:

a primary node corresponding to the alert, and a set of secondary nodes that are connected to the primary node, wherein the set of secondary nodes comprises:

a set of hypotheses node chains, wherein each hypotheses node chain comprises a first level hypothesis node and a second level hypothesis node associated with the first level hypothesis node, wherein each hypothesis node represents a hypothesis, to be further investigated by a user, associated with the alert, and wherein the set of hypotheses node chains is selected and generated from a list of hypotheses node chains based on a knowledge base;

render the interactive graph interface on a user interface;

obtain a user input indicative of a selection of a first secondary node from the set of secondary nodes via the user interface; and perform an action based on the user input.

* * * * *